(12) United States Patent
Jones

(10) Patent No.: US 12,241,563 B1
(45) Date of Patent: Mar. 4, 2025

(54) WATER SUPPLY MONITORING AND CONTROL SYSTEM

(71) Applicant: Craig L Jones, Saint David, AZ (US)

(72) Inventor: Craig L Jones, Saint David, AZ (US)

(*) Notice: Subject to any disclaimer, the term of this patent is extended or adjusted under 35 U.S.C. 154(b) by 0 days.

(21) Appl. No.: 18/733,237

(22) Filed: Jun. 4, 2024

(51) Int. Cl.
*F16K 31/05* (2006.01)
*F16K 31/04* (2006.01)
*F16K 37/00* (2006.01)
*G08B 21/18* (2006.01)

(52) U.S. Cl.
CPC ........ *F16K 31/046* (2013.01); *F16K 37/0041* (2013.01); *G08B 21/185* (2013.01)

(58) Field of Classification Search
CPC .. F16K 31/046; F16K 37/0041; G08B 21/185
See application file for complete search history.

(56) References Cited

U.S. PATENT DOCUMENTS

| | | | |
|---|---|---|---|
| 11,586,158 B1 | 2/2023 | Downing et al. | |
| 11,924,054 B1 | 3/2024 | Comber | |
| 11,924,227 B2 | 3/2024 | Pi et al. | |
| 12,085,189 B2* | 9/2024 | Haldeman | F16K 3/12 |
| 2010/0332149 A1 | 12/2010 | Scholpp | |
| 2011/0030875 A1* | 2/2011 | Conte | F16L 55/1652 138/104 |
| 2013/0269798 A1* | 10/2013 | Wood | A01G 25/167 137/551 |
| 2014/0278246 A1 | 9/2014 | Clark et al. | |
| 2016/0076909 A1 | 3/2016 | Klicpera | |
| 2016/0117070 A1* | 4/2016 | Rose | G06F 3/0484 715/738 |
| 2016/0163177 A1* | 6/2016 | Klicpera | E03B 7/071 137/59 |
| 2022/0131748 A1 | 4/2022 | Smith et al. | |
| 2022/0408233 A1 | 12/2022 | Samuel et al. | |
| 2023/0251118 A1* | 8/2023 | Modderman | G01F 25/10 73/1.16 |
| 2023/0332976 A1 | 10/2023 | Chen et al. | |
| 2024/0003245 A1 | 1/2024 | Havre et al. | |
| 2024/0288088 A1* | 8/2024 | Donovan | F16K 31/055 |

* cited by examiner

*Primary Examiner* — Hongmin Fan
(74) *Attorney, Agent, or Firm* — Carson Patents; Gregory D Carson

(57) ABSTRACT

The wireless supervisory control and data acquisition water supply monitoring system is an apparatus/device for monitoring the conditions of water supply equipment, lines, storage, and processing tanks using a wireless and/or cellular network for data transfer and exchange. The present invention is compact and completely cellular, reducing the wiring needed compared to what is currently available. The water monitoring system of the present invention includes remote monitoring, remote control for starting and stopping pumps and valves, automatic control for pumps, notification/alerts when sensor values are out of range, notification/alerts when system goes offline, notification/alerts for power outages, monitoring amp usage of pump motors to track health of pump or motor, generic four to twenty milliamp connections custom sensors, mapping features, simple user interface for ease of use, and company administrator feature which allows company administrator to add company users and control user access.

12 Claims, 3 Drawing Sheets

WATER SUPPLY MONITORING AND CONTROL SYSTEM

BACKGROUND OF THE INVENTION

Technical Field

This invention relates generally to a wireless supervisory control and data acquisition water supply monitoring system. This invention relates more particularly to an apparatus/device for monitoring the conditions of water supply equipment, lines, storage, and processing tanks using a wireless and/or cellular network for data transfer and exchange.

This invention relates generally to apparatuses and devices for supervisory control and data acquisition of small to medium scale water supply systems to enable monitoring and control of the system components.

Background Art

In the prior art, there are the following:

One prior art patent document pertains to a wireless sensor system and associated methods. This system is particularly designed for sensor deployment in environments where wired connections are impractical. The patent highlights a design that includes a sensor, processor, and a power source (typically a battery), with these components integrated in a manner that facilitates wireless communication. The essence of this invention is to provide a system that can efficiently gather and transmit data from multiple sensors over a wireless network, enabling applications across various sectors such as industrial monitoring, environmental sensing, and infrastructure management.

Another prior art patent document describes a water use monitoring apparatus. This technology includes a system that features components for detecting water flow and quality within a network, which could be applied in residential or industrial settings to monitor and manage water usage more efficiently. The system includes sensors for detecting various parameters and conditions of the water to provide detailed feedback on usage patterns and potential inefficiencies. This apparatus aims to improve water conservation efforts and ensure sustainable water management by providing real-time data that can influence user behavior or trigger automatic adjustments to the water system. The detailed monitoring capabilities it offers make it a valuable tool for managing water resources in an era where water scarcity is increasingly a critical issue.

Further, a prior art patent document describes methods and systems for managing communications within remote Supervisory Control and Data Acquisition (SCADA) and telemetry networks. It utilizes reinforced machine learning to process the header data of messages from remote data radios. This helps predict which radios are ready to respond, thereby optimizing the time allocation on shared wireless channels for efficient communication. This system is particularly beneficial for environments with high traffic, improving throughput and reducing latency.

Also present in the prior art is a hybrid unsupervised machine learning framework designed specifically for intrusion detection in industrial control systems (ICS). This framework integrates various machine learning models to improve the detection and management of cybersecurity threats within industrial environments. The technology focuses on enhancing the ability to identify unauthorized activities and potential cyber threats without the need for pre-labeled training data, thereby adapting more dynamically to new and evolving security challenges in real-time operational environments.

Another prior art patent document describes systems and methods for advanced pipeline leak detection. It employs a convolutional neural network (CNN) model trained to classify pipeline pressure measurement images at various sensor sites. This system captures pressure surge information, processes it in a cloud-based system, and determines whether a detected surge is a leak, enhancing the accuracy and efficiency of pipeline monitoring.

Also found in the prior art is a system for detecting leaks in a fluid production network. This system utilizes real-time data from multiple pressure sensors distributed throughout the network. It generates an expected operational region in a multidimensional domain, operates a leak detection system within this region, tracks data, and issues a detection signal if deviations indicating a leak are found. This method enhances the accuracy and responsiveness of leak detection in hydrocarbon fluid networks.

Additionally, a prior art document describes a system for monitoring a water distribution network. It involves receiving and collecting data from sensors in the network, analyzing this data to detect abnormalities like leaks, and then managing this information for system improvements and maintenance. The method emphasizes efficiency in data collection and the ability to handle large volumes of data to ensure accurate monitoring and reporting.

A prior art document also describes a water use monitoring apparatus integrated with residential or commercial water supply systems. It features sensors for monitoring water flow and temperature, a microprocessor for data handling, and wireless capabilities to communicate usage data to devices like smartphones or computers. This system allows for real-time monitoring and management of water consumption, aimed at enhancing water conservation efforts in various environments.

In light of the foregoing prior art, there is a need for a wireless supervisory control and data acquisition water supply monitoring system that is compact and completely cellular. The water supply monitoring system of the present invention is small in comparison to what is present in the prior art. Further, the present invention is cellular, thus reducing the wiring needed compared to what is currently available.

BRIEF SUMMARY OF THE INVENTION

According to a first aspect of the invention, there is a water monitoring system comprising: a controller device in a housing having a micro processor running an algorithm, a temperature sensor, a first sensor connection, a second sensor connection, a third sensor connection, and/or a fourth sensor connection for connection to a first, a second sensor, a third sensor, and/or a fourth sensor, and a first relay/valve connection, a second relay/valve connection, a third relay/valve connection, and/or a fourth relay/valve connection for connection to a first relay/valve, a second relay/valve, a third relay/valve, and/or a fourth relay/valve; a cellular modem; an uninterruptible power supply; and a display having a motion sensor configured to turn off said display.

According to a second aspect of the invention, there is a water monitoring system wherein said first sensor, said second sensor, said third sensor, and/or said fourth sensor is configured for operating at up to five volts, twelve volts, or twenty-four volts.

According to a third aspect of the invention, there is a water monitoring system wherein said first sensor, said second sensor, said third sensor, and/or said fourth sensor is configured for operating between four and twenty milliamps.

According to a fourth aspect of the invention, there is a water monitoring system wherein said algorithm comprises a website customer portal configured with a customer home page displaying a simple overview of a water system showing a current value and a trend or direction history of a set of sensor values related to a sensor, and enabling said sensor to be calibrated and/or adjusted.

According to a fifth aspect of the invention, there is a water monitoring system wherein said algorithm is further configured to provide historical data viewable to show said set of sensor values over time in a graph.

According to a sixth aspect of the invention, there is a water monitoring system wherein said algorithm further comprises a mapping and location function.

The mapping and location values are configured from the customer's cellular GPS. There is no GPS sensors included with the SCADA devices.

According to a seventh aspect of the invention, there is a water monitoring system wherein said algorithm is further configured to control said relay/valve connections in a manual mode or an automatic mode, and turn a connected peripheral device on and off remotely via a cell phone, a tablet, or a computer or if in said automatic mode said relays or valve connections can be automatically turned on and off based on a value of a sensor (local or remote).

According to an eighth aspect of the invention, there is a water monitoring system wherein said algorithm is further configured to enable a user to configure an alert based on a high value or a low value of said first, second, third, and/or fourth sensor connections, wherein said alert further comprises sending either or both of an simple messaging system text and an email, issuing said alert to indicate whether the controller is offline, and/or issuing said alert to indicate when there is a power outage at a location, and/or of said first sensor connection, said second sensor connection, said third sensor connection, and/or said fourth sensor connection are below or above an acceptable operating value.

According to a ninth aspect of the invention, there is a plurality of water monitoring systems for sharing data and operating together to control a water system each comprising a controller device in a housing having a micro processor running an algorithm, a temperature sensor, a first sensor connection, a second sensor connection, a third sensor connection, and/or a fourth sensor connection for connection to a first, a second sensor, a third sensor, and/or a fourth sensor, and a first relay/valve connection, a second relay/valve connection, a third relay/valve connection, and/or a fourth relay/valve connection for connection to a first relay/valve, a second relay/valve, a third relay/valve, and/or a fourth relay/valve; a cellular modem; an uninterruptible power supply; and a display having a motion sensor configured to turn off said display.

According to a tenth aspect of the invention, there is a plurality of water monitoring systems wherein said first sensor, said second sensor, said third sensor, and/or said fourth sensor is configured for operating at up to five volts, twelve volts, or twenty-four volts.

According to an eleventh aspect of the invention, there is a plurality of water monitoring systems wherein said first sensor, said second sensor, said third sensor, and/or said fourth sensor is configured for operating between four and twenty milliamps.

According to a twelfth aspect of the invention, there is a plurality of water monitoring systems wherein said algorithm comprises a website customer portal configured with a customer home page displaying a simple overview of a water system showing a current value and a trend or direction history of a set of sensor values related to a sensor, and enabling said sensor to be calibrated and/or adjusted.

According to a thirteenth aspect of the invention, there is a plurality of water monitoring systems wherein said algorithm is further configured to provide historical data viewable to show said set of sensor values over time in a graph.

According to a fourteenth aspect of the invention, there is a plurality of water monitoring systems wherein said algorithm further comprises a mapping and location function.

According to a fifteenth aspect of the invention, there is a plurality of water monitoring systems wherein said algorithm is further configured to control said relay/valve connections in a manual mode or an automatic mode, and turn a connected peripheral device on and off remotely via a cell phone, a tablet, or a computer or if in said automatic mode said relays/valve connections can be automatically turned on and off based on a value of a sensor (local or remote).

According to a sixteenth aspect of the invention, there is a plurality of water monitoring systems wherein said algorithm is further configured to enable a user to configure an alert based on a high value or a low value of said first, second, third, and/or fourth sensor connection, wherein said alert further comprises sending either or both of an simple messaging system text and an email, issuing said alert to indicate whether the controller is offline, and/or issuing said alert to indicate when there is a power outage at a location, and/or of said first sensor connection, said second sensor connection, said third sensor connection, and/or said fourth sensor connection are below or above an acceptable operating value.

Advantages of the water monitoring system of the present invention include remote monitoring, remote control for starting and stopping pumps and valves, automatic control for pumps, notification/alerts when sensor values are out of range, notification/alerts when system goes offline, notification/alerts for power outages, monitoring amp usage of pump motors to track health of pump or motor, generic 4 to 20 milli amp connections custom sensors, mapping features, simple user interface for ease of use, and company administrator feature which allows company administrator to add company users and control user access.

The invention will now be described, by way of example only, with reference to the accompanying drawings in which:

DETAILED DESCRIPTION OF THE INVENTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Throughout this specification, the word "comprise," or variations thereof such as "comprises" or "comprising," will be understood to imply the inclusion of a stated element, integer or step, or group of elements integers or steps, but not the exclusion of any other element, integer or step, or group of elements, integers or steps.

Index of Labeled Features in Figures. Features are listed in numeric order by Figure in numeric order.

Figure 1:
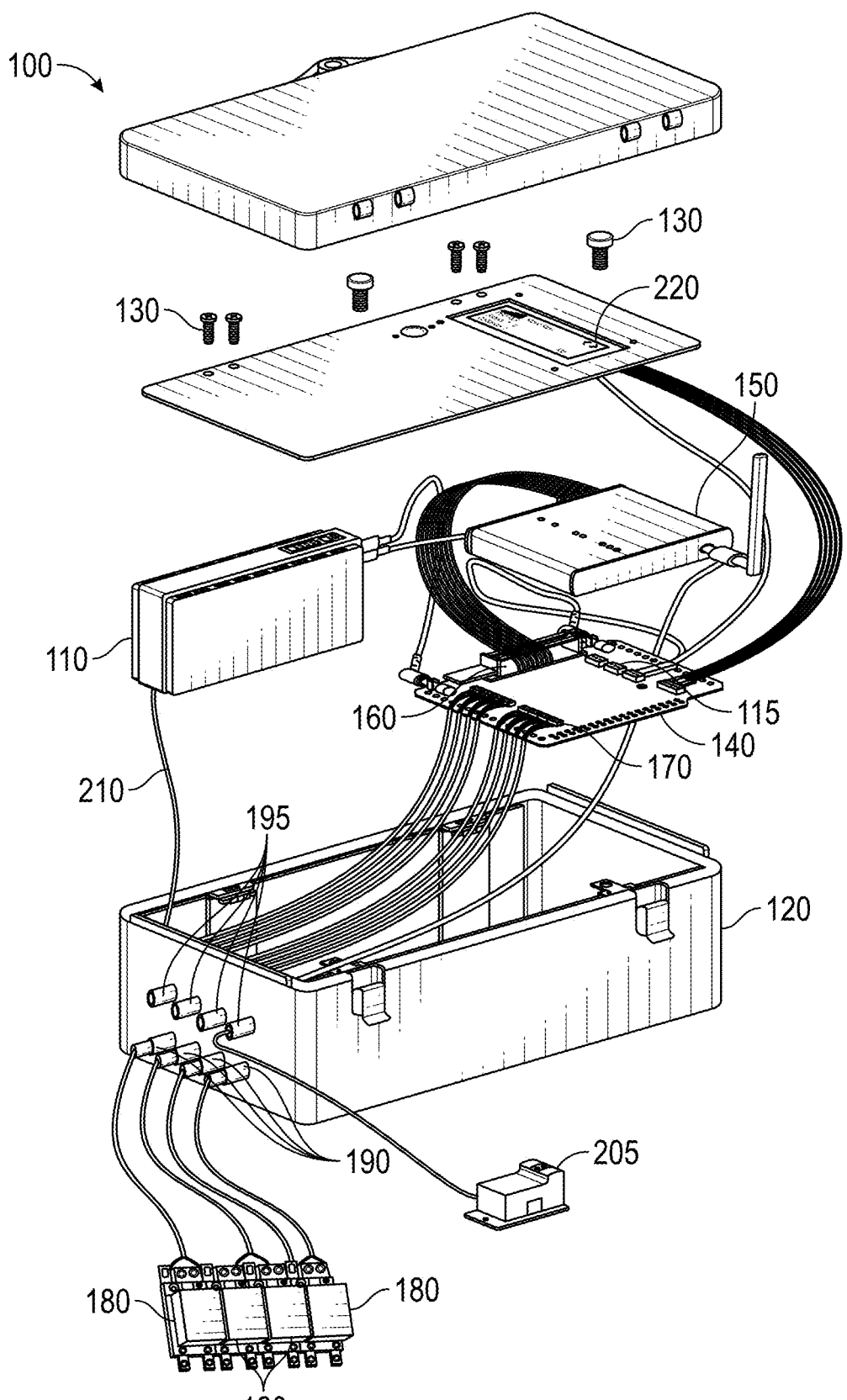
FIG. 1 is an exploded 3D perspective view of the water monitoring system according to the invention.
Figure 2:
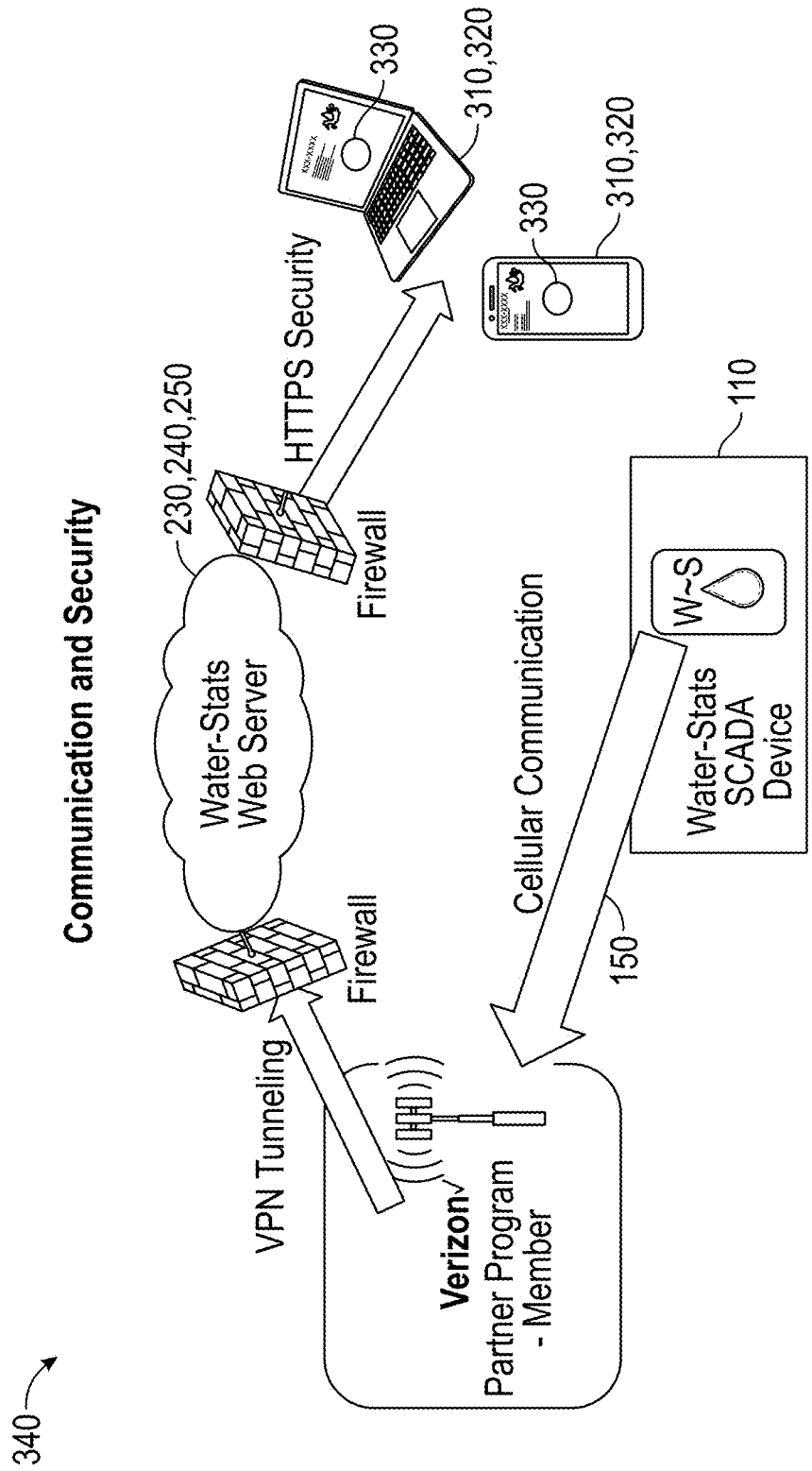
FIG. 2 is a cellular communication from the SCADA device to the cellular tower, to the firewall, and to the website is secure through cellular communications security and VPN/APN private network tunneling and a secure firewall of the water monitoring system according to the invention.
Figure 3:
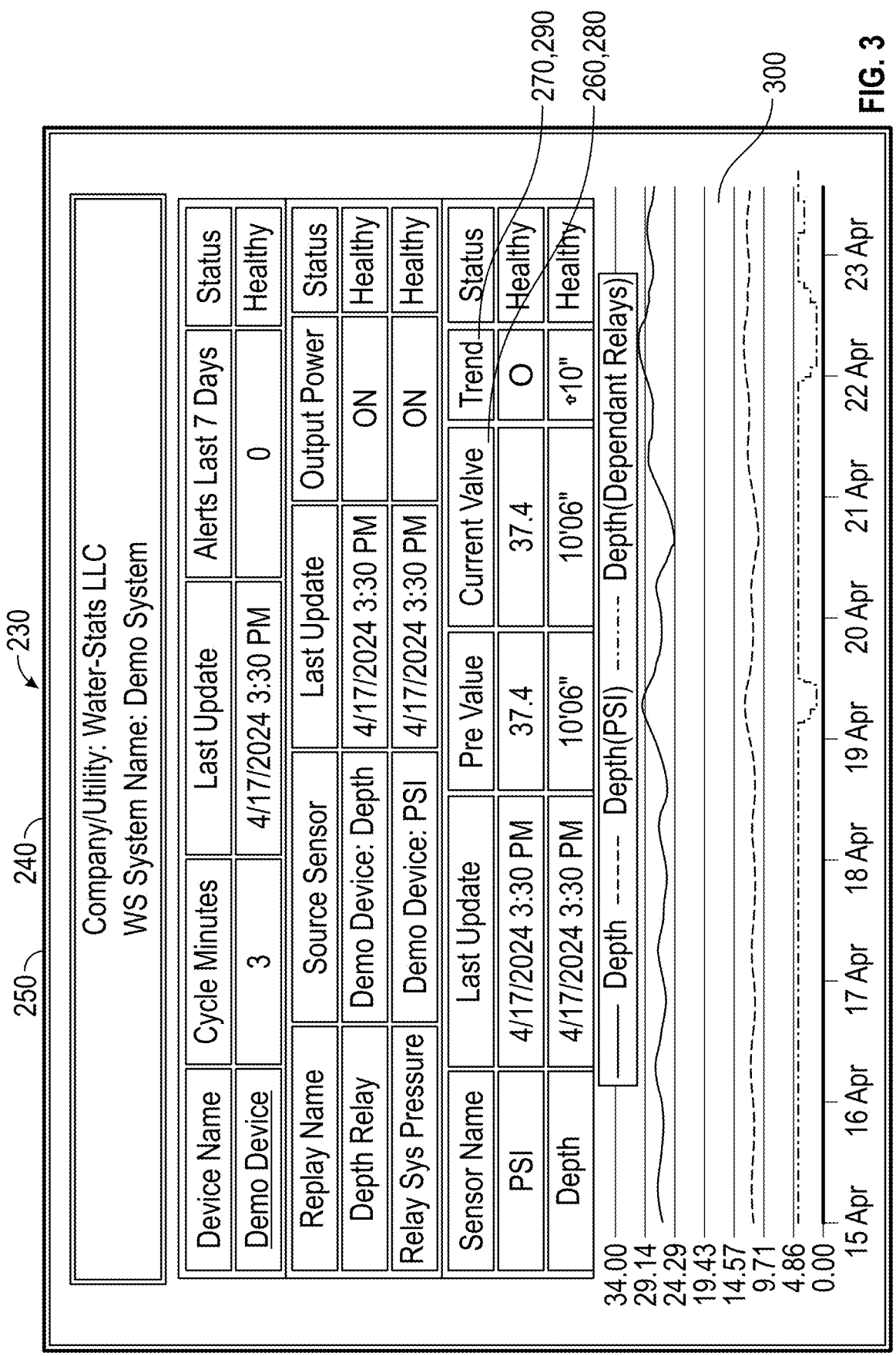
FIG. 3 is a website customer portal of the water monitoring system according to the invention.

Referring to the Figures, there is shown in FIG. 1 the following features:

Element 100 which is a water monitoring system.

Element 110 which is an uninterruptible power supply (battery pack).

Element 115 which is a controller device.

Element 120 which is a housing.

Element 130 which is an attachment bolt.

Element 140 which is a micro processor running an algorithm.

Element 150 which is a cellular modem.

Element 160 which is a temperature sensor.

Element 170 which is a sensor and relay connections on controller board.

Element 180 which is a relay.

Element 190 which is a relay connection.

Element 195 which is a sensor connection.

Element 205 which is a sensor.

Element 210 which is a cable to an uninterruptible power supply.

Element 220 which is a display having a motion sensor configured to turn off said display.

Element 230 which is a website customer portal.

Element 240 which is a customer home page.

Element 250 which is a water system overview.

Element 260 which is a current value.

Element 270 which is a trend/direction history.

Element 280 which is a set of sensor values.

Element 290 which is a historical data.

Element 300 which is a graph.

Element 310 which is a connected peripheral device.

Element 320 which is a cell phone, a tablet, or a computer.

Element 330 which is an alert.

Element 340 which is a cellular communication from the SCADA device to the cellular tower, to the firewall, and to the website is secure through cellular communications security and VPN/APN private network tunneling and a secure firewall.

The device/apparatus of the present invention is manufactured or built by assembling the components as collectively available from their respective arts and as identified and combined in the elements of each of the claims. The software algorithms of the present invention used to accomplish the uses herein are coded, compiled, and executed on conventional computer hardware available at the time of application for the patent rights of the present invention. Any current technology capable of providing the combination of elements and their utility as in the present invention are also suitable to create embodiments of the device/apparatus of the present invention.

In general the device/apparatus of the present invention can be assembled/made with any combination of the following:

Up to 4 mix and match sensor connections (12v 4-20ma);

Up to 4 relay or valve connections;

Cellular communication;

Mapping/location provided from a cellular phone and/or smart phone;

Relays or valves that can be controlled in a manual mode with operator interaction as needed or an automatic mode where parameters, settings, operational limits, and control responses are entered into the system for automated actions when certain conditions are present. The device/apparatus of the present invention can turn peripherals on and off remotely via cell phone, tablet, or computer. If in automatic mode, relays or valves can be automatically turned on and off based on sensor (local or remote) values;

Customer configuration for alerts based on sensor high values and low values;

Customer alerts via SMS and/or email;

Customer alerts indicating the controller is offline; and

Customer alerts if there is a power outage at the controller location.

Further, every controller device includes a temperature sensor. This temperature sensor does not count as one of the 4 mix and match sensors referenced above.

Historical data can be viewed to show sensor values over time in a graph available in the customer portal. The customer home page displays a simple "heartbeat" view of their water system. The customer can see all of the current values as well as the trend or direction of the sensor values. All configurations for controlling and operational functionality of the system can be set from the website customer portal.

Additionally, all sensors can be calibrated. Calibration is an essential process in various fields and for numerous devices and instruments. Here are some primary reasons to calibrate:

Accuracy: Calibration ensures that instruments are providing accurate and reliable measurements. This is crucial in scenarios where precision is necessary, such as in scientific research, manufacturing processes, and medical tests.

Quality Control: Regular calibration helps maintain the quality standards of processes and products. It ensures that manufacturing processes are consistent and that the final products meet the required specifications and safety standards.

Compliance with Standards: Many industries have regulatory requirements that mandate regular calibration of equipment. Compliance helps avoid legal issues and ensures that operations meet industry standards, such as ISO (International Organization for Standardization).

Safety: Calibration is vital for the safe operation of equipment. Inaccurate measurements can lead to safety hazards, especially in industries like aviation, chemical manufacturing, and pharmaceuticals.

Cost Efficiency: Proper calibration can help detect inefficiencies and potential failures in equipment before they lead to major breakdowns, thus saving on costly repairs and downtime.

Data Consistency: For research and data analysis, calibration ensures that data collected over time is consistent and comparable, which is critical for tracking trends and making informed decisions.

Optimization: Calibration helps in optimizing the performance of equipment by ensuring it operates efficiently and within its intended parameters. This can lead to energy savings and improved overall performance.

Regular calibration is therefore a critical maintenance task that enhances performance, ensures safety, and maintains compliance in various professional fields.

The devices of the present invention may each contain the following:

Cellular Modem—These modems are certified by Verizon and we communicate through an Access Point Name (APN) tunnel (much like a VPN), between the Verizon cellular network and our firewall and server for secure a transmission of data. This provides the security needed to protect the system from hacking and intrusions. In the event of a Cellular outage, alerts will be sent from our web service to inform your company that there is a cellular outage and the device is offline.

Mini UPS—Our mini UPS allows our SCADA device to remain online and keep transmitting during power outages. Depending on what peripherals are connected to the device, the UPS can keep the SCADA running for several hours without intervention. If a power outage occurs, we detect the outage and send alerts within minutes of the outage.

LCD Display—this is on every device for configuration and setup. But when the device is in use, it is just available for potential troubleshooting.

Built in motion sensor—Turns off the LCD display light when the box is closed. This is just to minimize power consumption.

Controller Board—Our controller board has ports for up to 4 sensors and/or up to 4 relays:

Sensors—We support most 4 to 20 milliamp sensors. After installation, each sensor can be calibrated on the web portal to provide the most accurate readings as possible. Our Water-Stats Web Portal provide configuration for alerts or each of the sensors. These alerts can be configured to send SMS text messages, or emails to each user that wants such alerts. The most commonly used sensors are Pressure sensors—These read the system pressure in the pipe that it is installed on. The simplest installation is connecting it to a faucet connected to the water line that you want to test.

Depth Sensors—These are also 4 to 20 milliamp pressure sensors, but they are configured (on the Web Portal) to calculate the depth of the water based on the pressure.

Current Sensors—These are Split Core Current Transducers for easy installation. These sensors provide regular feedback as to the number of amps being used by the pump or electrical device that it is connected to.

Relays—each relay can be configured to be run in automatic mode or in manual mode Automatic Mode—The relay can be configured to go on when a particular sensor is below a configured value (such as a 30 ft tank dropping below a depth of 28 ft). They can also be configured to go off when a high value is reached (such as a 30 ft tank reaching a level of 29.5 feet)

Manual Mode—a relay can be configured to be turned on or off manually through the Water-Stats web portal. This is used when certain pumps are generally left on, but occasionally need to be turned off remotely.

Valves—Electric Valves can be turned on or off using the same logic as Relays. We generally encourage customers to use relays for turning such valves on or off. This provides the flexibility for customers to choose the electronic valves they prefer or are already using. But we can make recommendations for such electronic valves that they may need.

In a preferred embodiment of the invention, there is a water monitoring system comprising: a controller device in a housing having a micro processor running an algorithm, a temperature sensor, a first sensor connection, a second sensor connection, a third sensor connection, and/or a fourth sensor connection for connection to a first, a second sensor, a third sensor, and/or a fourth sensor, and a first relay/valve connection, a second relay/valve connection, a third relay/valve connection, and/or a fourth relay/valve connection for connection to a first relay/valve, a second relay/valve, a third relay/valve, and/or a fourth relay/valve; a cellular modem; an uninterruptible power supply; and a display having a motion sensor configured to turn off said display.

In an alternate embodiment of the invention, there is a water monitoring system wherein said first sensor, said second sensor, said third sensor, and/or said fourth sensor is configured for operating at up to five volts, twelve volts, or twenty-four volts.

In an alternate embodiment of the invention, there is a water monitoring system wherein said first sensor, said second sensor, said third sensor, and/or said fourth sensor is configured for operating between four and twenty milliamps.

In an alternate embodiment of the invention, there is a water monitoring system wherein said algorithm comprises a website customer portal configured with a customer home page displaying a simple overview of a water system showing a current value and a trend or direction history of a set of sensor values related to a sensor, and enabling said sensor to be calibrated and/or adjusted.

In an alternate embodiment of the invention, there is a water monitoring system wherein said algorithm is further configured to provide historical data viewable to show said set of sensor values over time in a graph.

In an alternate embodiment of the invention, there is a water monitoring system wherein said algorithm further comprises a mapping and location function.

The mapping and location values are configured from the customer's cellular GPS. There is no GPS sensors included with the SCADA devices. Further, it should be noted that the five volt SCADA device does not use four to twenty milliamp sensors—it uses five volt sensors and reads them based on voltages between zero volts and five volts to calculate the sensor values.

The twelve volt and twenty-four volt controllers only use four to twenty milliamp rather than five volt sensors. The five volt controller is offered to customers looking for a more economical price. The five volt sensors are not as precise but provide generally acceptable data. All three controller types use twelve volt relays.

In an alternate embodiment of the invention, there is a water monitoring system wherein said algorithm is further configured to control said relay/valve connections in a manual mode or an automatic mode, and turn a connected peripheral device on and off remotely via a cell phone, a tablet, or a computer or if in said automatic mode said relays or valve connections can be automatically turned on and off based on a value of a sensor (local or remote).

In an alternate embodiment of the invention, there is a water monitoring system wherein said algorithm is further configured to enable a user to configure an alert based on a high value or a low value of said first, second, third, and/or fourth sensor connections, wherein said alert further comprises sending either or both of an simple messaging system text and an email, issuing said alert to indicate whether the controller is offline, and/or issuing said alert to indicate when there is a power outage at a location, and/or of said first sensor connection, said second sensor connection, said third sensor connection, and/or said fourth sensor connection are below or above an acceptable operating value.

In a preferred embodiment of the invention, there is a plurality of water monitoring systems for sharing data and operating together to control a water system each comprising a controller device in a housing having a micro processor running an algorithm, a temperature sensor, a first sensor connection, a second sensor connection, a third sensor connection, and/or a fourth sensor connection for connection to a first, a second sensor, a third sensor, and/or a fourth sensor, and a first relay/valve connection, a second relay/valve connection, a third relay/valve connection, and/or a fourth relay/valve connection for connection to a first relay/valve, a second relay/valve, a third relay/valve, and/or a fourth relay/valve; a cellular modem; an uninterruptible power supply; and a display having a motion sensor configured to turn off said display.

In an alternate embodiment of the invention, there is a plurality of water monitoring systems wherein said first sensor, said second sensor, said third sensor, and/or said fourth sensor is configured for operating at up to five volts, twelve volts, or twenty-four volts.

In an alternate embodiment of the invention, there is a plurality of water monitoring systems wherein said first sensor, said second sensor, said third sensor, and/or said fourth sensor is configured for operating between four and twenty milliamps.

In an alternate embodiment of the invention, there is a plurality of water monitoring systems wherein said algorithm comprises a website customer portal configured with a customer home page displaying a simple overview of a water system showing a current value and a trend or direction history of a set of sensor values related to a sensor, and enabling said sensor to be calibrated and/or adjusted.

In an alternate embodiment of the invention, there is a plurality of water monitoring systems wherein said algorithm is further configured to provide historical data viewable to show said set of sensor values over time in a graph.

In an alternate embodiment of the invention, there is a plurality of water monitoring systems wherein said algorithm further comprises a mapping and location function.

In an alternate embodiment of the invention, there is a plurality of water monitoring systems wherein said algorithm is further configured to control said relay/valve connections in a manual mode or an automatic mode, and turn a connected peripheral device on and off remotely via a cell phone, a tablet, or a computer or if in said automatic mode said relays/valve connections can be automatically turned on and off based on a value of a sensor (local or remote).

In an alternate embodiment of the invention, there is a plurality of water monitoring systems wherein said algorithm is further configured to enable a user to configure an alert based on a high value or a low value of said first, second, third, and/or fourth sensor connection, wherein said alert further comprises sending either or both of an simple messaging system text and an email, issuing said alert to indicate whether the controller is offline, and/or issuing said alert to indicate when there is a power outage at a location, and/or of said first sensor connection, said second sensor connection, said third sensor connection, and/or said fourth sensor connection are below or above an acceptable operating value.

Advantages of the water monitoring system of the present invention include:

Remote Monitoring: Allows users to observe the system's operational status, sensor data, and other critical information from a distance, ensuring they can keep track of performance and issues without being physically present.

Remote Control for Starting and Stopping Pumps and Valves: Enables users to operate pumps and valves remotely. This feature is crucial for managing flow rates and system operations without manual intervention.

Automatic Control for Pumps: Automatically turns pumps on or off to maintain the desired levels in tanks and consistent system pressure, optimizing the system's efficiency and reducing the need for manual control.

Notifications/Alerts for Sensor Anomalies: Sends alerts to users when sensor readings deviate from preset thresholds, allowing for immediate response to potential issues like leaks or blockages.

System Offline Alerts: Notifies users if the monitoring system itself loses connectivity or power, ensuring quick action to restore monitoring and control.

Power Outage Notifications: Alerts users about power failures that could affect system operation, which is critical for preventing system downtime and managing backup power solutions.

Monitoring Amp Usage of Pump Motors: Tracks the electrical consumption of pump motors to assess their health and efficiency. This can indicate when a motor is under stress, potentially preventing failures through proactive maintenance.

Support for 4 to 20 Milliamp Connections for Custom Sensors: Allows integration of a wide range of sensors using the industry-standard 4-20 mA signal, providing flexibility in monitoring various parameters.

Mapping Features: Could include graphical representations of the system's layout, operational status of different components, and historical data mapping, aiding in troubleshooting and system analysis. It only allows users to see a map of their system and the ability to locate systems and sites in their water system.

Simple User Interface: Ensures the system is easy to use and accessible to all users, regardless of their technical expertise, which is essential for effective system management.

Company Administrator Feature: Allows designated administrators to manage user access and permissions, adding an important layer of security and operational control within a company.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A water monitoring system comprising:
   a controller device in a housing having
     a micro processor running an algorithm,
     a temperature sensor,
     a first sensor connection, a second sensor connection, a third sensor connection, and/or a fourth sensor connection for connection to a first sensor, a second sensor, a third sensor, and/or a fourth sensor, and
     a first relay/valve connection, a second relay/valve connection, a third relay/valve connection, and/or a fourth relay/valve connection for connection to a first relay/valve, a second relay/valve, a third relay/valve, and/or a fourth relay/valve;
   a cellular modem;
   an uninterruptible power supply; and
   a display having a motion sensor configured to turn off said display;
   wherein said algorithm is further configured to
     control said relay/valve connections in a manual mode or an automatic mode, and
     turn a connected peripheral device on and off remotely via a cell phone, a tablet, or a computer or if in said automatic mode said relays or valve connections can be automatically turned on and off based on a value of a sensor (local or remote); and
   wherein said algorithm is further configured to
     enable a user to configure an alert based on a high value or a low value of said first, second, third, and/or fourth sensor connections,
       wherein said alert further comprises
         sending either or both of a simple messaging system text and an email,
         issuing said alert to indicate whether the controller is offline, and/or
         issuing said alert to indicate when there is a power outage at a location, and/or of said first sensor connection, said second sensor connection, said third sensor connection, and/or said fourth sensor connection are below or above an acceptable operating value.

2. The water monitoring system of claim 1 wherein said first sensor, said second sensor, said third sensor, and/or said fourth sensor is configured for operating at up to five volts, twelve volts, or twenty-four volts.

3. The water monitoring system of claim 1 wherein said first sensor, said second sensor, said third sensor, and/or said fourth sensor is configured for operating between four and twenty milliamps.

4. The water monitoring system of claim 1 wherein said algorithm comprises
   a website customer portal configured with a customer home page displaying a simple overview of a water system showing a current value and a trend or direction history of a set of sensor values related to a sensor, and enabling said sensor to be calibrated and/or adjusted.

5. The water monitoring system of claim 4 wherein said algorithm is further configured to
   provide historical data viewable to show said set of sensor values over time in a graph.

6. The water monitoring system of claim 1 wherein said algorithm further comprises a mapping and location function.

7. A plurality of water monitoring systems for sharing data and operating together to control a water system each comprising
   a controller device in a housing having
     a micro processor running an algorithm,
     a temperature sensor,
     a first sensor connection, a second sensor connection, a third sensor connection, and/or a fourth sensor connection for connection to a first sensor, a second sensor, a third sensor, and/or a fourth sensor, and
     a first relay/valve connection, a second relay/valve connection, a third relay/valve connection, and/or a fourth relay/valve connection for connection to a first relay/valve, a second relay/valve, a third relay/valve, and/or a fourth relay/valve;
   a cellular modem;
   an uninterruptible power supply; and
   a display having a motion sensor configured to turn off said display;
   wherein said algorithm is further configured to control said relay/valve connections in a manual mode or an automatic mode, and
     turn a connected peripheral device on and off remotely via a cell phone, a tablet, or a computer or if in said automatic mode said relays/valve connections can be automatically turned on and off based on a value of a sensor (local or remote); and
   wherein said algorithm is further configured to
     enable a user to configure an alert based on a high value or a low value of said first, second, third, and/or fourth sensor connection,
       wherein said alert further comprises
         sending either or both of a simple messaging system text and an email,
         issuing said alert to indicate whether the controller is offline, and/or
         issuing said alert to indicate when there is a power outage at a location, and/or of said first sensor connection, said second sensor connection, said third sensor connection, and/or said fourth sensor connection are below or above an acceptable operating value.

8. The plurality of water monitoring systems of claim 7 wherein said first sensor, said second sensor, said third sensor, and/or said fourth sensor is configured for operating at up to five volts, twelve volts, or twenty-four volts.

9. The plurality of water monitoring systems of claim 7 wherein said first sensor, said second sensor, said third sensor, and/or said fourth sensor is configured for operating between four and twenty milliamps.

10. The plurality of water monitoring systems of claim 7 wherein said algorithm comprises
    a website customer portal configured with a customer home page displaying a simple overview of a water system showing a current value and a trend or direction history of a set of sensor values related to a sensor, and enabling said sensor to be calibrated and/or adjusted.

11. The plurality of water monitoring systems of claim 10 wherein said algorithm is further configured to
    provide historical data viewable to show said set of sensor values over time in a graph.

12. The plurality of water monitoring systems of claim 7 wherein said algorithm further comprises a mapping and location function.

* * * * *